(12) United States Patent
Yanagimoto

(10) Patent No.: US 8,175,440 B2
(45) Date of Patent: May 8, 2012

(54) BROADCAST RECEIVER AND BROADCAST RECEIVING METHOD

(75) Inventor: Shingo Yanagimoto, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 393 days.

(21) Appl. No.: 12/576,850

(22) Filed: Oct. 9, 2009

(65) Prior Publication Data

US 2010/0231785 A1 Sep. 16, 2010

(30) Foreign Application Priority Data

Mar. 12, 2009 (JP) ................ 2009-059449

(51) Int. Cl.
*H04N 5/765* (2006.01)
(52) U.S. Cl. ...................... 386/232; 386/233
(58) Field of Classification Search .............. 386/232, 386/233, 200, 263, 300, 353; 348/441, 446
See application file for complete search history.

(56) References Cited

U.S. PATENT DOCUMENTS

| 2005/0270418 A1* | 12/2005 | Kondo et al. ................ 348/452 |
| 2006/0179459 A1 | 8/2006 | Chiba |
| 2007/0296811 A1 | 12/2007 | Miyazaki et al. |
| 2009/0317049 A1 | 12/2009 | Adachi et al. |

FOREIGN PATENT DOCUMENTS

| JP | 09-261560 | 10/1997 |
| JP | 2002-101380 | 4/2002 |
| JP | 2005-302103 | 10/2005 |
| JP | 2006-217343 | 8/2006 |
| JP | 2007-312317 | 11/2007 |
| JP | 2008-187474 | 8/2008 |
| JP | 2008-236603 | 10/2008 |
| JP | 2009-194550 | 8/2009 |
| WO | WO 2008-007745 | 1/2008 |

OTHER PUBLICATIONS

Japanese Office Action dated Dec. 15, 2009 for application No. JP 2009-059449 (U.S. Appl. No. 12/576,850). (English Translation).
Japanese Office Action dated Mar. 16, 2010 for application No. JP 2009-059449 (U.S. Appl. No. 12/576,850). (English Translation).

* cited by examiner

*Primary Examiner* — Robert Chevalier
(74) *Attorney, Agent, or Firm* — Blakely, Sokoloff, Taylor & Zafman LLP

(57) ABSTRACT

A broadcast receiver includes: an image analyzer configured to perform an analysis on a series of images; a recorder configured to record a result of the analysis and the series of images; and an image processor configured to perform image processing on a target image included in the series of images recorded in the recorder based on the result of the analysis performed for images subsequent to the target image.

3 Claims, 4 Drawing Sheets

BROADCAST RECEIVER AND BROADCAST RECEIVING METHOD

CROSS REFERENCE TO RELATED APPLICATION(S)

The present disclosure relates to the subject matters contained in Japanese Patent Application No. 2009-059449 filed on Mar. 12, 2009, which are incorporated herein by reference in its entirety.

FIELD

The present invention relates to a broadcast receiver and a broadcast receiving method.

BACKGROUND

Broadcast receivers for recording and playing back image signals of broadcast programs etc. have been developed (e.g. see JP-A-2005-302103). Image signals are recorded on recorders such as hard disks, so that the recorded image signals can be played back.

In order to improve image quality, a predetermined process may be applied at the playback time. In this case, it will be convenient if contents of the process can be changed properly. For example, it can be conceived that images are analyzed so that contents of the process are changed in accordance with a result of the analysis.

However, it is not always easy to analyze images properly and reflect a result of the analysis on the contents of the process.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION OF THE EMBODIMENTS

Figure 1:
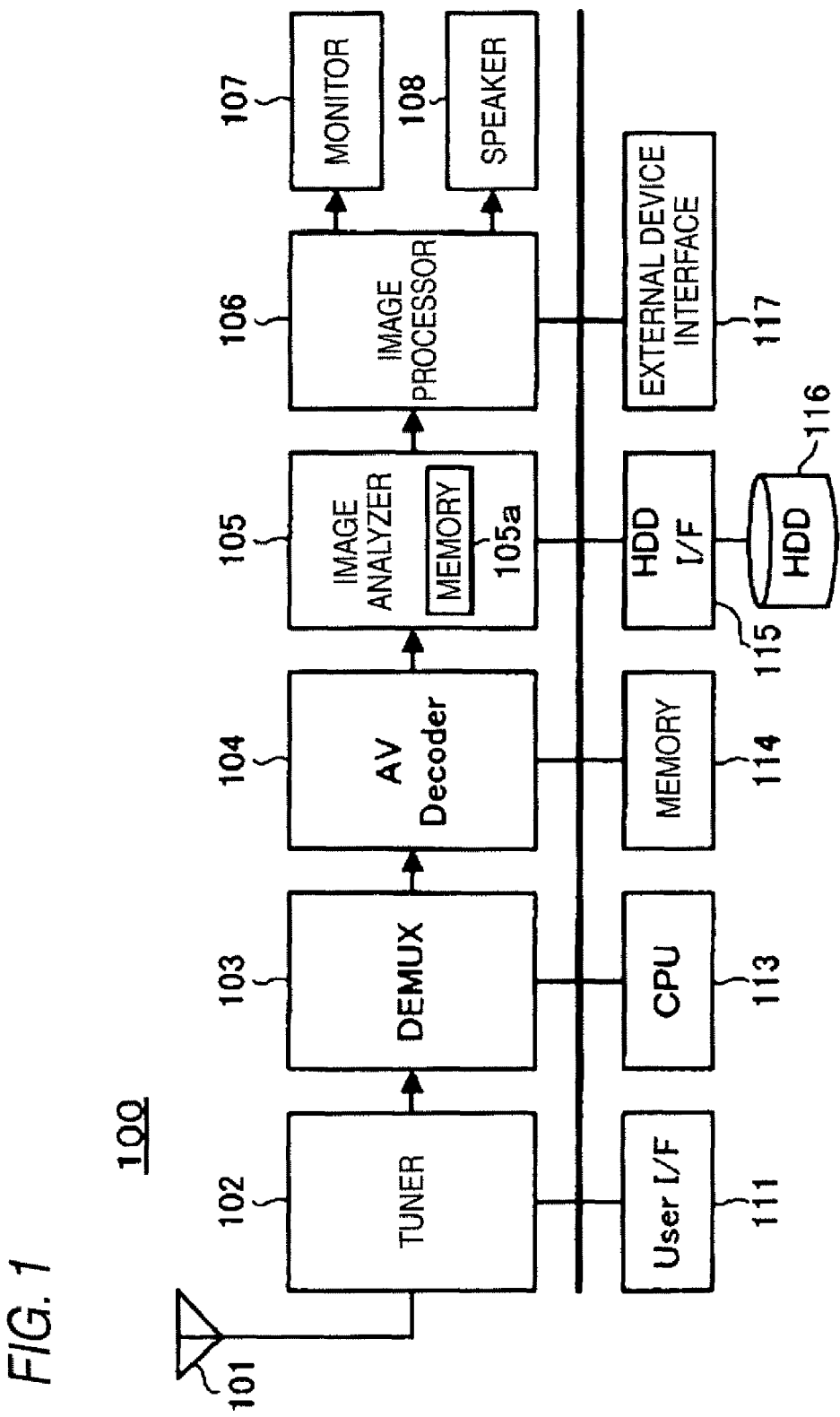
FIG. 1 is a block diagram showing a broadcast receiver according to an embodiment of the invention.

An embodiment of the invention will be described below in detail with reference to the drawings. FIG. 1 is a block diagram showing a broadcast receiver 100 according to an embodiment of the invention. The broadcast receiver 100 corresponds to a television set having recording function and serves as a recorder.

The broadcast receiver 100 has an antenna 101, a tuner 102, a demultiplexer (DEMUX) 103, an AV (Audio Video) decoder 104, an image analyzer 105, an image processor 106, a monitor 107, a speaker 108, a user interface (I/F) 111, a CPU (Central Processing Unit) 113, a memory 114, an HDD (Hard Disk Drive) interface 115, an HDD (Hard Disk Drive) 116, and an external device interface 117.

The antenna 101 receives broadcast signals transmitted from a broadcasting station. The tuner 102 selects a signal of a desired channel from the signals received by the antenna 101 and demodulates the selected signal to thereby generate a transport stream (hereinafter abbreviated to as "TS"). This TS is a multiplexed signal including a broadcast signal and SI/PSI. For example, the broadcast signal is an MPEG-2 broadcast signal.

The demultiplexer 103 demultiplexes the broadcast signal, the SI/PSI, etc. from the TS given from the tuner 102, and outputs the demultiplexed broadcast signal to the AV decoder 104. During recording, the broadcast signal is output to both the AV decoder 104 and the HDD I/F 115. In this case, image recording on the HDD 116 and image analysis by the image analyzer 105 are performed concurrently, as will be described later.

The AV decoder 104 decodes the broadcast signal given from the demultiplexer 103 to generate audio and video signals and outputs the audio and video signals to the image analyzer 105 or the image processor 106. In an normal mode (in which playback is performed without recording), the video signal is output to the image processor 106 after images of the video signal are analyzed in real time by the image analyzer 105. In a recording mode, the video signal is output to the image analyzer 105 and its exclusive-use memory 105a concurrently with recording of the video signal as video on the HDD 116. For example, in a chasing (time-shift) playback mode, video information (such as luminance change, etc.) is recorded on the memory 105a concurrently with a recording process in the inside, so that the image processor 106 performs optimum processing by using the information.

The image analyzer 105 analyzes images of the video signal output from the AV decoder 104 and stores a result of the analysis in the memory 105a. This analysis result is used when a recorded program is viewed (including the Time-Shift Playback mode and a made for viewing the recorded program afterwards), so that the images can be analyzed with high accuracy. The details of the analysis will be described later.

The image processor 106 adjusts image quality by processing the images (video signal) based on the analysis result of the image analyzer 105. Since the analysis result is stored in the memory 105a, image processing can be performed based on an analysis result of images after images which are being processed. The image processing of the image processor is classified into two types of image processing, that is, image processing performed for an on-air program based on real-time image analysis, and image processing performed for a program to be recorded. For example, each type of image processing includes image processing according to change of an external environment or an audience environment. For example, this is a process of recognizing brightness of an audience environment by a "brightness sensor" and automatically controlling the image quality to a level proper to the environment. The automatic control includes brightness control, color depth control, sharpness control, and dynamic gamma control. In this embodiment, the image processing performed for a program to be recorded requires more analysis results than the image processing performed for an ordinary on-air program. For example, assuming that image processing for an ordinary on-air program requires one frame or two frames stored in the memory 105a so that the image processing can be performed based on image analysis of such one or two frames stored in the memory 105a, then image processing for a program to be recorded requires a larger number of frames stored in the memory 105a than the number of frames used for the ordinary image analysis so that the image processing can be performed based on image analysis results of the larger number of frames stored in the memory 105a. Incidentally, details thereof will be described later.

The monitor 107 is a display device such as a CRT, a liquid crystal display device, etc. The speaker 108 is an audio output device.

The user I/F 111 is connected to a wireless receiving portion and a key input portion which are not shown. The user I/F 111 accepts operation information. The wireless receiving portion accepts operation information transmitted by wireless (e.g. infrared rays) from a remote controller. The remote controller has various operation buttons (such as a 'cursor' button, a 'blue' button, a 'red' button, a 'decide' button, and a 'return' button), so that operation information can be input. For example, the key input portion is a portion of operation buttons on a body of the broadcast receiver 100. The key input portion can be used for inputting various kinds of operation information in the same manner as the remote controller.

The CPU 113 controls overall operation of the broadcast receiver 100.

The memory 114 includes an ROM (Read Only Memory), an RAM (Random Access Memory), and an NVRAM (Non Volatile RAM). The ROM stores programs, etc. for operating the CPU 113. The RAM is used during the operation of the CPU 113 so that programs, data, etc. can be written into the RAM. The NVRAM stores a control table T1 which will be described later.

The HDD interface 115 controls reading/writing of data from/into the HDD 116. The HDD 116 records broadcast programs. That is, the HDD 116 serves as a storage portion for storing broadcast programs. Incidentally, the HDD 116 is detachably attached to the broadcast receiver 100. In addition, any other storage medium (e.g. a flash memory) than the HDD can be used.

The external device interface 117 duplicates a program recorded on the HDD 116 to an external recording medium such as a memory card, an optical disk, etc.

A. Processing Difference Among Normal Mode, Recording Mode and Recorded Image Playback Mode As will be described below, the broadcast receiver 100 in each of an normal mode, a recording mode, a recorded image playback mode and a Time-Shift Playback mode, has its operation state switched as follows. Incidentally, this switching is executed by the CPU 113.

(1) Normal Mode (in which Playback is Performed without Recording)

An operation of the broadcast receiver 100 in the normal mode, i.e. in the mode where a broadcast program is not recorded but played back directly, will be described below. In this mode, a broadcast signal is processed sequentially by the tuner 102, the demultiplexer 103, the AV decoder 104, the image analyzer 105 and the image processor 106. That is, the demultiplexer 103 demultiplexer a TS given from the tuner 102 into a broadcast signal. The AV decoder 104 generates a video signal from the broadcast signal. The image processor 106 adjusts the image quality of the video signal by performing image analysis in real time.

(2) Recording Mode

An operation of the broadcast receiver 100 in the recording mode will be described. In this mode, a broadcast signal is processed via two paths. For example, one path is formed from the tuner 102, the demultiplexer 103, the HDD interface 115 and the HDD 116. The other path is formed from the tuner 102, the demultiplexer 103, the AV decoder 104, the image analyzer 105, the HDD interface 115 and the HDD 116. That is, image recording via the former path and image analysis and analysis result recording via the latter path are executed concurrently.

(3) Recorded Image Playback Mode (in which a Recorded Program is Viewed Afterwards)

An operation of the broadcast receiver 100 in the recorded image playback mode will be described. In this mode, a TS recorded on the HDD 116 is processed with high accuracy by the image processor 106 using a result of image analysis recorded on the memory 105a. That is, the image quality is adjusted based on a result of image analysis. In addition, it is preferable that the analysis result recorded on the memory 105a is recorded automatically on the HDD 116 in the same manner as the program TS when the program is ended.

(4) Time-Shift Playback Mode

Time-Shift Playback means playback of a program which is being recorded. In this mode, both recording and playback of one and the same program are performed concurrently (but with time shift between a recording point and a playback point of the program). In this mode, processing (2) in the recording mode and processing (3) in the playback mode are executed concurrently. That is, image recording on the HDD 116 and image analysis on the image analyzer 105 and the memory 105a are executed concurrently so that the image quality is adjusted based on a result of the image analysis (on the memory 105a) in the Time-Shift Playback mode.

B. Image Analysis

Image analysis of the image analyzer 105 will be described in detail. Contents of the image analysis can be described as follows.

(1) Temporal Transition of Luminance

Figure 2:
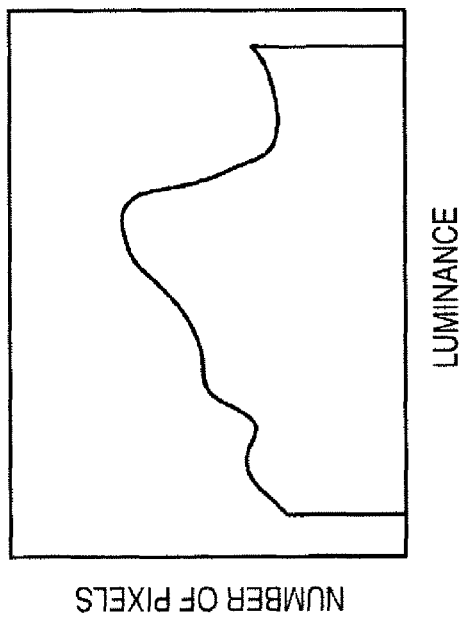
FIG. 2 is a graph showing an example of a luminance distribution.

Temporal transition of a luminance distribution on a display screen (frame) can be obtained as an analysis result. FIG. 2 shows an example of a graph showing a luminance distribution. In the graph, a horizontal axis and a vertical axis correspond to a value of luminance and a frequency (the number of pixels in this case) on a display screen (frame), respectively. Such a luminance distribution can be recorded on the memory 105a in a time-series manner.

In this case, luminance distributions on all frames of a broadcast program can be recorded. For example, assuming a broadcast time of 10 minutes at 60 frames per second, then 36,000 (=60×60×10) luminance distributions will be recorded. Alternatively, frames may be sampled (e.g. a luminance distribution every several frames may be recorded). Alternatively, temporal transition of a statistic value (such as an average luminance value or a luminance peak value) of each luminance distribution may be recorded. Incidentally, luminance in a predetermined time containing a target time point in the program can be used for calculation of the statistic value. For example, temporal transition of an average value of luminance in a range of plus and minus several minutes with a target time point as its center is recorded.

(2) Detection of Change to Commercial

Temporal transition of detection of a commercial (advertisement) can be obtained as an analysis result. When, for example, lots of commercials are broadcast stereophonically while audio in a program is broadcast monaurally or bilingually, an audio change can be used for discriminating between program and commercial, so that each commercial can be detected.

As a result, different processes can be given to the commercial and the program respectively when the image quality is adjusted by the image processor 106. For example, the program and the commercial are controlled respectively based on whether the image quality should be adjusted or not. In addition, the program and the commercial can be handled individually with respect to an image analysis result (e.g. temporal transition of luminance). For example, the analysis result is used only in the program to adjust the image quality of the program.

(3) Detection of Change to Movie

Temporal transition of detection of movie images can be obtained as an analysis result. Detection of the movie images will be described. Movie images are different from television images in frame rate and whether images are interlaced or not. Generally, movie images per se have 24 frames per second and are not interlaced (i.e. scan lines are not thinned out). On the other hand, television images have 60 frames per second and are interlaced (i.e. scan lines are thinned out). (Odd field) images each formed from odd-number scan lines and (even field) images each formed from even-number scan lines are contained alternately in television images. Because movie images are different from television images in terms of image specification as described above, image transformation is required for playback of movie images on a television set.

Figure 3:
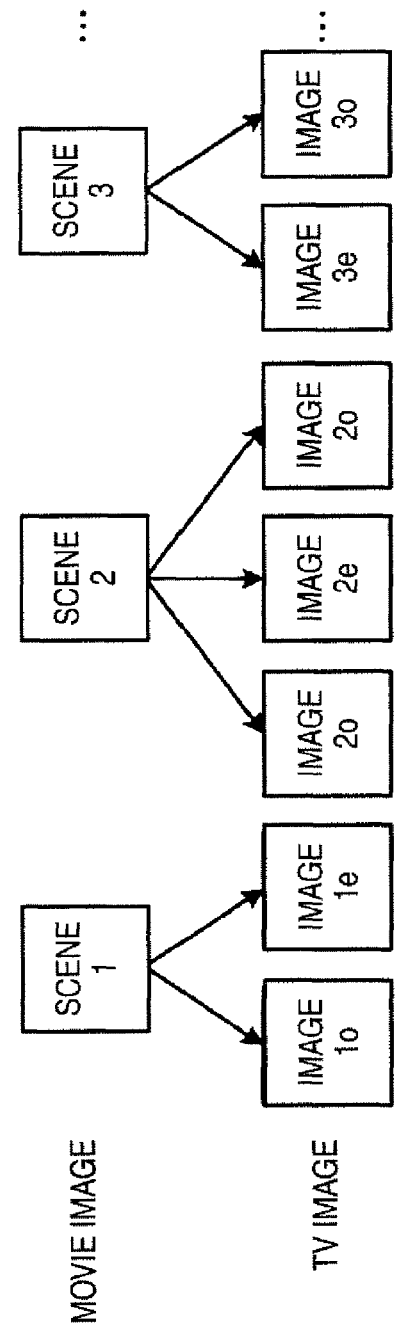
FIG. 3 is a schematic view showing transformation of movie images into television images.

FIG. 3 shows generation (image transformation) of television images from movie images. The movie images contain a scene 1, a scene 2, a scene 3, . . . in a time sequence. An image 1o of an odd field and an image 1e of an even field are generated sequentially from the scene 1. An image 2o of an odd field, an image 2e of an even field and an image 2o of an odd field are generated sequentially from the scene 2. An image 3e of an even field and an image 3o of an odd field are generated sequentially from the scene 3. As a result, interlaced images of odd fields and even fields are generated alternately. When each scene of movie ages is converted into two and three alternate interlaced images in this manner, the movie images are converted into television images (2-3 pull down).

As described above, the television images converted from the movie images have predetermined periodicity. That is, adjacent images 1o and 1e (or images 3o and 3e) are highly scene-identical because the images 1o and 1e are generated from one and the same original scene. Alternate images 2o are completely the same. When determination is made as to whether or not the same image appears periodically as described above, detection can be made as to whether the television images are derived from the movie images or not (movie (film) detection). Incidentally, it is possible to select suitably whether movie should be detected based on either or both of identity of adjacent images and identity of alternate images. In this manner, the movie can be detected based on the periodicity of appearance of identical images.

The aforementioned mage analysis results ((1) luminance distribution, (2) detection of change to commercial, and (3) detection of change to movie) are recorded on the memory 105a or the HDD 116 as described above. Consequently, an analysis result of images previous to images which are being processed can be used for next image processing. In the Time-Shift Playback mode, an analysis result corresponding to time shift between recording images and playback images can be used at the time of image processing. In the ordinary playback mode (playback mode not using a Time-Shift Playback function), an analysis result of the whole program can be used at the time of image processing.

The above description means that image processing can be performed based on an analysis result of images after the images which are being processed. Here, the term "which are being processed" means that image processing (e.g. (1) temporal transition of luminance, (2) temporal transition of detection of commercial or (3) adjustment of image quality in accordance with temporal transition of detection of movie images, as will be described later) is being performed in the image processor 106. In addition, the term "images which are being processed" means images which are being subjected to image processing by the image processor 106 for audience. Since all images of the program are subjected to image processing by the image processor 106 sequentially, part of all the images of the program are "images which are being processed". The term "images after the images which are being processed" means future images (images later in time sequence) relative to the images which are being subjected to image processing. Accordingly, the term "analysis of images after the images which are being processed" means analysis of future images relative to the images which are being subjected to image processing (e.g. (1) luminance distribution, (2) detection of change to commercial or (3) detection of change to movie).

C. Image Processing (Image Quality Adjustment)

Details of adjustment of image quality by the image processor 106 will be described below in detail.

(1) Adjustment of Image Quality in Accordance with Temporal Transition of Luminance The image quality can be adjusted in accordance with temporal transition of luminance. Here, the image quality corresponding to a whole program for audience or a chapter (block) including a target scene can be adjusted.

For example, average luminance of a program or a chapter is classified into several stages (e.g. eight stages). Image quality is switched in accordance with the stages. When there are generally a large number of dark scenes in the program or chapter, image quality is adjusted based on a dark setting even though there are bright scenes in part of the program or chapter.

Luminance before and after a scene to be played back is classified into several stages (e.g. eight stages). Image quality is switched in accordance with the stages. Such a process is effective particularly in the Time-Shift Playback mode. For example, when playback starts at a large number of dark scenes and then has bright scenes increasing so gradually that the whole screen becomes a bright scene finally, the level of brightness increases gradually in accordance with the passage of time.

Figures 4, 5:
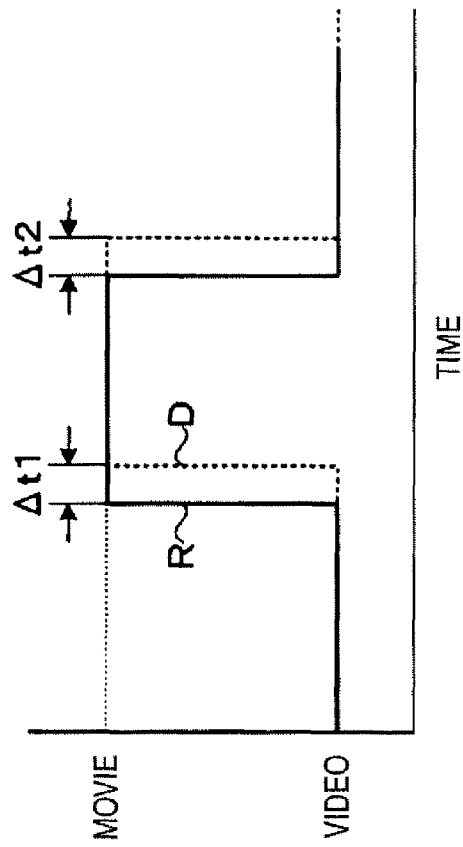
FIG. 4 is a schematic view showing an example of a control table T1.
FIG. 5 is a graph showing temporal transition of a detection result of movie images.

Adjustment of image quality by the image processor 106 can be controlled, for example, based on a control table T1 recorded on the HDD 116. FIG. 4 is a schematic view showing an example of the control table T1.

The control table T1 indicates correspondence between an analysis result (luminance in this case) and processing contents. That is, in the control table T1, the processing contents are changed in accordance with luminance. Here, the range of luminance is classified into eight stages based on an average value of luminance in a whole program. The processing contents are changed in accordance with the stages. Besides the "average value", a "peak value" is conceived to be used as a criterion for calculation of luminance. Besides the "whole program" (program unit), "chapter (block) unit" or "predetermined time (e.g. one minute to one hour) of the program including a target time point" can be exemplified as a criterion for calculation of time.

Here, both "color tone" and "light control" are used as examples of the processing contents in accordance with the stages of luminance. Incidentally, it will not cause any problem even when either of "color tone" and "light control" is used as the processing contents. "Color tone" means change of color tone of a reference color (e.g. white) on the screen. For example, "white" is changed to a reddish, bluish or yellowish color. As a result, the color tone of the screen changes corresponding to all or part of the program. This color tone can be expressed, for example, in color coordinates or color temperature.

"Light control" means adjustment of luminance on the screen of the monitor 107. That is, the screen of the monitor 107 can be displayed with luminance different from its original luminance if occasion demands. Here, when the monitor 107 is a liquid crystal display device, luminance on the screen may be controlled based on change in brightness (luminance) of a backlight of the liquid crystal display device.

The control table T1 can be changed properly by an input made through the user I/F 111

(2) Adjustment of Image Quality in Accordance with Temporal Transition of Detection of Commercial When a commercial is inserted into a program, the commercial may be regarded as being ignored in terms of temporal transition of luminance. The commercial is often different in pattern from the program. For example, a bright commercial may be inserted into a dark program. When the commercial is removed from program information, image quality can be adjusted properly.

(3) Adjustment of Image Quality in Accordance with Temporal Transition of Detection of Movie Images Image quality can be improved by transformation of interlaced images into non-interlaced (progressive) images (progressive transformation). Here, it is preferable that progressive transformation is performed in accordance with the original images.

As for a still image, a progressive image can be generated by combination of an image of an odd field and an image of an even field. As for moving images, temporally adjacent images (images of odd fields and images of even fields) do not necessarily correspond to each other. For this reason, when progressive images are generated by simple combination of these images, there is a possibility that image quality will deteriorate instead. To avoid this possibility, progressive ages are generated, for example, in such a manner that image information is generated from scan lines thinned out from interlaced images (interpolation process).

As for movie images, the original images are non-interlace images. Therefore, as long as the original images are processed properly, images with better image quality than those generated simply by the interpolation process can be generated. As described above, the movie images are converted to interlaced images while 24 frames are increased to 60 frames (see FIG. 3). The images converted thus have such a tendency that the same image appears repetitively. Therefore, when movie images have been detected, image quality can be improved in such a manner that scenes 1 to 3 are generated from adjacent images (e.g. images 1o and 1e, images 2o and 2e, and images 3o and 3e) (i.e. progressive images are generated) and then the frame rate of the scenes 1 to 3 is changed. Images formed from scan lines not thinned out can be displayed to thereby reduce flickering on the screen.

As described above, when movie images have been detected (i.e. when the same image appear periodically), progressive images are generated by combination of adjacent interlaced images. Incidentally, when movie images have not been detected, generation of progressive images by combination of adjacent interlaced images is stopped. In this case, progressive images can be generated by an interpolation process between scan lines in each non-interlace image as described above.

Here, when a program includes both movie images (television images derived from a movie) and video images (television images not derived from any movie), there is a possibility that image quality will deteriorate as a result of progressive transformation. FIG. 5 shows the relationship between change to movie images or television images and detection of the images. Each of graphical representations R and G shows change of images and detection of the images. That is, detection of images is delayed (for a time lag Δt1 or Δt2) from change of the images. On this occasion, movie images are processed as video images in the time lag Δt1. Video images are processed as movie images in the time lag Δt2. That is, errors of primary processing will occur. In the former, the influence of the error appears as occurrence of flickering but the influence on visibility is relatively small. On the other hand, in the latter, the influence of the error appears as occurrence of jagging and the influence on visibility is large.

Therefore, temporal transition of detection of movie images is confirmed and processing contents are changed before detection of change from movie images to video images so that lowering of visibility caused by the processing errors can be prevented. For example, when the video images are continued for a constant period (e.g. one or more seconds) after the movie images, processing is switched earlier by a predetermined time than detection timing of the switching. Also when the video images are changed to the movie images, processing is switched earlier likewise so that lowering of visibility caused by the processing errors can be prevented.

(4) Adjustment of Image Quality in Accordance with Audience Environment and Type of Audience Program The image quality may be adjusted in accordance with the audience environment and the type of the audience program. For example, processing contents are changed in accordance with the category of the program. Broadcast programs are classified into categories which indicate program types such as drama, sports, news, etc. A signal expressing the category is contained in SI/PSI. Accordingly, image quality can be adjusted automatically in accordance with the category. For example, the category can be used for changing luminance in the aforementioned control table T1. That is, both or either of color tone and light intensity can be changed in accordance with the category.

Figure 6:
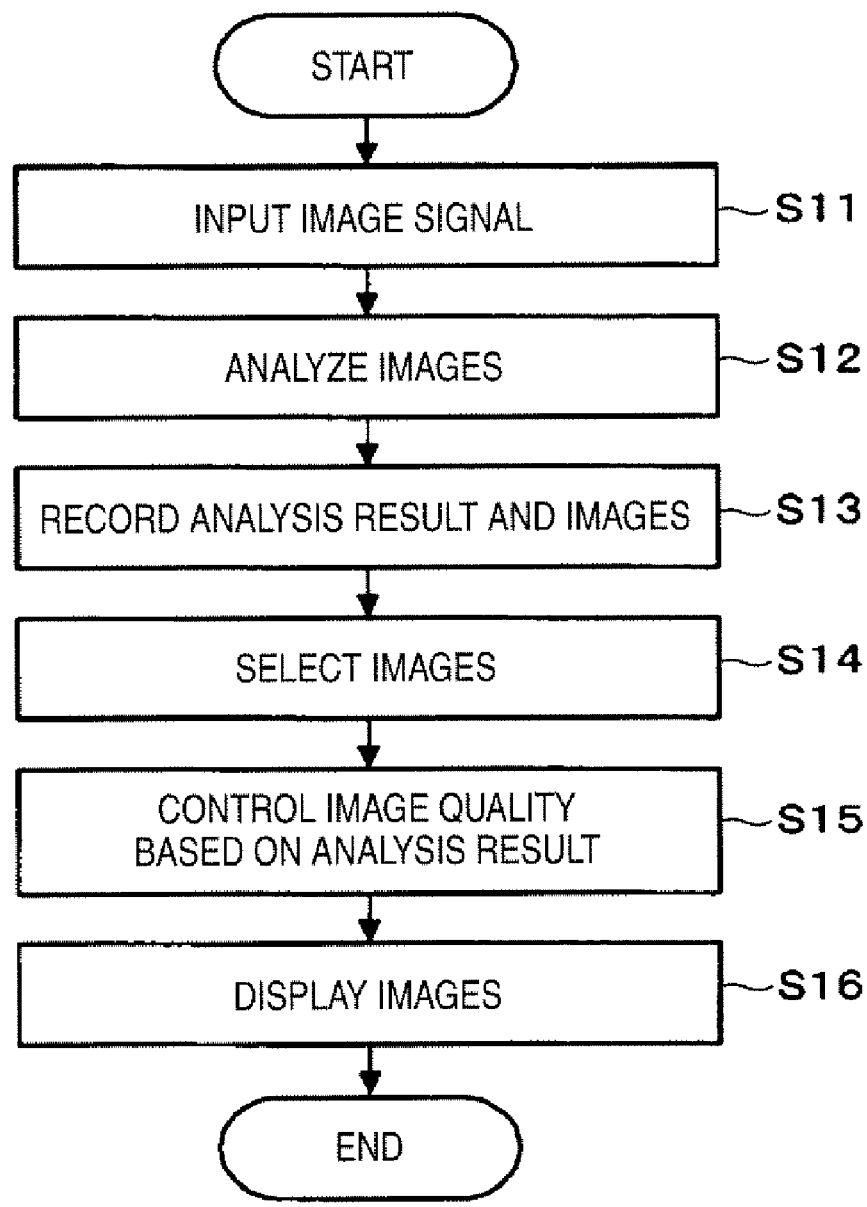
FIG. 6 is a flow chart showing an example of an operation procedure of the broadcast receiver.

FIG. 6 is a flow chart showing an example of an operation procedure in the broadcast receiver 100. FIG. 6 shows the case where playback of images is started after recording of the images is completed. Incidentally, in the case of so-called Time-Shift Playback, steps S11 to S13, S15 and S16 are executed continuously while step S14 is omitted.

(1) Image Signal Input and Image Analysis (steps S11 and S12)

A TS is input to the demultiplexer (DEMUX) 103 from the tuner 102 (input of an image signal). This TS is converted into a video signal by the demultiplexer (DEMUX) 103 and the AV decoder 104, and images of the video signal are analyzed by the image analyzer 105. In this manner, for example, luminance distributions are obtained.

(2) Analysis Result and Image Recording (Step S13)

An analysis result obtained by the image analyzer 105 is recorded on the memory 105a, and the analysis result is further recorded on the HDD 116 after completion of image recording (recording of an analysis result). The TS given from the tuner 102 is recorded on the HDD 116 (image recording). Image recording is completed thus. As for Time-Shift Playback, both image recording and playback are performed concurrently.

(3) Selection of Images (Programs) (Step S14)

Generally, a plurality of programs are recorded as a recording result. In the playback mode, one of the programs is selected by the user interface (I/F) 111. As for the Time-Shift Playback mode, it is unnecessary to select any program.

(4) Adjustment of Image Quality using Analysis Result, and Display of Images (Steps S15 and S16)

For playback of a recorded program, the image processor 106 adjusts image quality based on the analysis result. As described above, color tone and/or light control, progressive transformation, etc. can be performed in accordance with the images. Because the analysis result has been stored in the memory 105a, image processing can be performed based on the analysis result of images after images which are being processed.

As described above, in the embodiment, an analysis result of images is held in the memory 105a or the HDD 116 so that more optimal video control can be performed. It is conceived that both image analysis and image quality adjustment may be performed concurrently while the user is watching television (real-time playback). In this case, it is however difficult to use a temporally subsequent analysis result.

On the other hand, in the embodiment, an analysis result of one program part after an analysis result of another program part which is being viewed can be used. Consequently, more proper image quality control can be performed compared with real-time playback. When both playback and recording are provided independently or when both playback and recording are provided simultaneously and concurrently (Time-Shift Playback), an analysis result can be used effectively for improvement in image quality. Particularly in the Time-Shift Playback mode, the audience is substantially not aware of a time lag from the real-time playback.

According to the invention, it is possible to provide a broadcast receiver and a broadcast receiving method by which image processing can be performed easily based on proper image analysis.

Although the embodiment according to the present invention has been described above, the present invention is not limited to the above-mentioned embodiment but can be variously modified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A broadcast receiver comprising:
    an image analyzer configured to analyze an image of a program and to detect whether or not the image of the program contains a movie image;
    a recorder configured to record a time history of detection of the movie image and the image of the program in parallel with an analysis of the image of the program by the image analyzer; and
    an image processor configured to generate a progressive image from a combination of adjacent interlace images contained in the movie image based on the time history of the detection of the movie image over the program when the movie image is detected, and to stop generating the progressive image from the combination of the adjacent interlace images before transitioning from detection to non-detection of the movie image.

2. The broadcast receiver of claim 1 further comprising:
    a display unit configured to display images being processed by the image processor; and
    a time-shift playback module configured to play back images recorded in the recorder on the display unit while the recorder records the images.

3. A broadcast receiving method comprising:
    analyzing an image of a program and detecting whether or not the image of the program contains a movie image;
    recording a time history of detection of the movie image and the image of the program in parallel with an analysis of the image of the program by the image analyzer; and
    generating a progressive image from a combination of adjacent interlace images contained in the movie image based on the time history of the detection of the movie image over the program when the movie image is detected, and stopping generating the progressive image from the combination of the adjacent interlace images before transitioning from detection to non-detection of the movie image.

* * * * *